United States Patent [19]
Löfmark

[11] Patent Number: 4,498,018
[45] Date of Patent: Feb. 5, 1985

[54] BALANCING IMPEDANCE INCLUDED IN A FORK

[75] Inventor: Bengt G. Löfmark, Skärholmen, Sweden

[73] Assignee: Telefonaktiebolaget LM Ericsson, Stockholm, Sweden

[21] Appl. No.: 439,028

[22] Filed: Nov. 4, 1982

[30] Foreign Application Priority Data

Nov. 24, 1981 [SE] Sweden ............................... 8106977

[51] Int. Cl.³ ............................................. H04B 1/58
[52] U.S. Cl. ........................................ 307/17; 333/32; 333/131
[58] Field of Search ......................... 323/355; 307/17; 333/25, 32, 124, 131

[56] References Cited

U.S. PATENT DOCUMENTS 2,747,165  5/1956  Fuller ................................. 333/131

FOREIGN PATENT DOCUMENTS 640427  2/1979  U.S.S.R. ............................... 333/32

Primary Examiner—William H. Beha, Jr.
Attorney, Agent, or Firm—Roberts, Spiecens & Cohen

[57] ABSTRACT

A simplified balancing impedance ($Z_2$) included in a transformer fork has a constant capacitor ($C_5$) connected in series with the termination resistor ($R_1$). The variable capacitance in the balancing impedance contains a resistor-capacitor network ($R_2$, $C_6$; $R_3$ $C_7$, $C_8$-$C_{11}$) connected in parallel with the termination resistance. The constant capacitor and the center point capacitor ($C_2$) on the balancing side of the fork can thus be replaced by one capacitor.

6 Claims, 2 Drawing Figures

BALANCING IMPEDANCE INCLUDED IN A FORK

FIELD OF INVENTION

The invention relates to a balancing impedance included in a fork, and more particularly to a transformer fork for transforming an incoming two-wire line to a four-wire connection. The impedance according to the invention preferably balances towards a resistance of a specified value (for example, 600 or 900 ohms) in series with a constant capacitance (for example, 2.16 $\mu$F) and towards a parallel capacitance, variable within a certain range (for example, 0–126 nF).

BACKGROUND

Transformer forks for two-wire to four wire conversion have been known for quite a long time. Usually two transformers are included in the fork, the transformers together forming the two-wire side, four-wire side and balancing side of the fork. In particular, it is previously known to form the transformers with two center point capacitors connected between two windings in the transformer on its line and balancing sides.

SUMMARY OF INVENTION

An object of a present invention is to simplify the operation of the balancing impedance included in a transformer fork by replacing the center point capacitor on the balancing side of the fork and the constant capacitance in the balancing impedance by only one capacitor the capacitance of which is lower than the two mentioned capacitances.

According to the proposed invention this object is attained by connecting, in parallel to the resistor which forms the termination resistance, a network of connectable resistor-capacitor links, which are connectable in parellel with the resistor. As a result the center point capacitor and the constant capacitor included in the balancing impedance, which capacitors are connected in series, can be replaced by only one capacitor, the capitance of which is less than the capacitance of the center point capacitor and the constant capacitor. This achieves that costs as well as space are saved.

The balancing impedance is then characterized by a two-wire path including a capacitor connected to a two-wire line including a line capacitance and a terminating resistance, a first and second four-wire path and a balancing path, a balancing impedance connected to said balancing path, said balancing impedance including a first capacitor whose capacitance corresponds to said two-wire line capacitance and to said capacitance in the two wire path and a first resistor, said first capacitance is connected in series with said first resistance whose value corresponds to the terminating resistance, a plurality of branches each including a capacitance are connected in parallel with a first resistor. A switch arrangement including each of the branches for selectively connecting each of the branches to the first capacitance at least one of the branches including a further resistor connected in parallel with an associated capacitor for simulating the line capacitance.

BRIEF DESCRIPTION OF DRAWING

The invention will be further described with reference to the attached drawing wherein.

DETAILED DESCRIPTION

Figure 1:
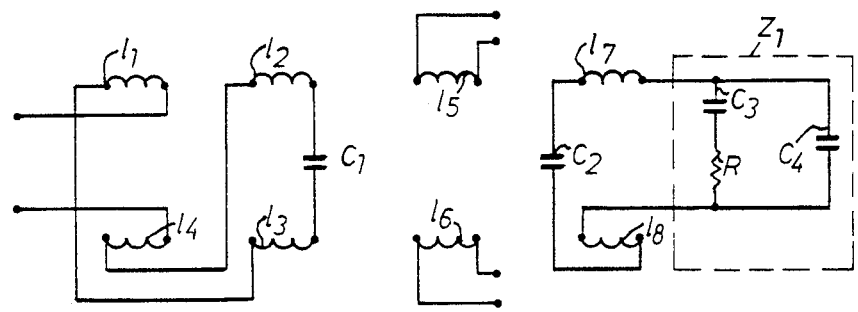
FIG. 1 shows a prior art transformer fork of known construction.

In FIG. 1, a fork circuit of a conventional construction is shown. The line side of the fork includes four windings $1_1$–$1_4$ and a center point capacitor $C_1$ is connected between the two windings $1_2$ and $1_3$. The two four-wire sides are constituted by the windings $1_5$ and $1_6$. The windings $1_7$ and $1_8$ are connected via the capacitor $C_2$ and form the balancing side. To the end points of these windings a balancing impedance $Z_1$ is connected consisting of the constant capacitor $C_3$ in series with the resistor R and, parallel to these, the variable capacitor $C_4$. To obtain good balance, it is valid that $C_1 = C_2$. The capacitors $C_1$ and $C_2$ usually are of the magnitude 1–2 $\mu$F. The capacitors $C_2$ and $C_3$ are substantially connected in series, since the capacitance of the variable capacitor $C_4$ is low (usually 0–0.126 $\mu$F). It would be desirable to join the capacitors $C_2$ and $C_3$ to one capacitor, since the series connection of, for example, 1.15 $\mu$F and 2.16 $\mu$F is 0.75 $\mu$F, which is much less than the sum $1.15 + 2.16 = 3.31$ $\mu$F. The variable parallel capacitance $C_4$, however, prevents this. The capacitor $C_4$ is usually constructed as a network of capacitors connected in parallel, each in series with a switch. If this network could be connected in parallel with the resistor R, said simplification could be effected. The resistor R should be equal to the terminating resistance of the line, usually 600 or 900 ohms.

Figure 2:
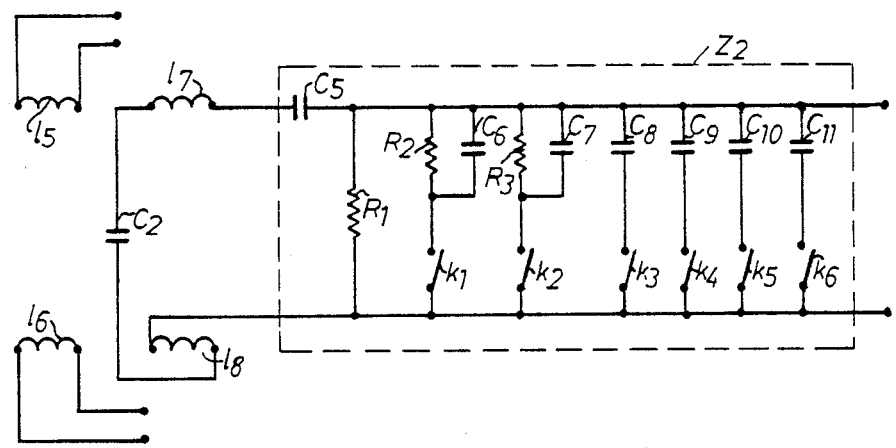
FIG. 2 shows the circuit diagram for the balancing impedance according to the invention connected to the balancing side of the fork according to FIG. 1.

According to the proposed invention this problem will be solved by connecting a network of parallel resistor-capacitor links in parallel with the resistor which constitutes the terminating resistor. FIG. 2 shows an embodiment of the invention. The line side of the fork transformer is excluded for the sake of simplicity. The capacitor $C_3$ in FIG. 1 is replaced by a capacitor $C_5$ connected in series with the center point capacitor $C_2$. Thus the capacitors $C_2$ and $C_5$ can be replaced by one capacitor. The series capacitor $C_5$ is included in the balancing impedance $Z_2$ and is connected to the end point of the winding $1_7$ and to a resistor $R_1$ connected to the end point of the second winding $1_8$ included in the fork transformer. In order to replace the constant capacitor $C_3$ according to FIG. 1 with the capacitor $C_5$, a capacitor network is connected, in parallel with the resistor $R_1$ with a number of connectible branches corresponding to the variable capacitor $C_4$ in FIG. 1. In the embodiment according to FIG. 2, each of two branches consists of a resistor $R_2$ and $R_3$ respectively, in parallel with a capacitor $C_6$ and $C_7$ respectively, the parallel connection being connected in series with the switches $k_1$, $k_2$. In addition there are further parallel branches, each including a capacitor $C_8$–$C_{11}$ in series with the switches $k_3, k_4, k_5$ and $k_6$ respectively.

The balancing impedance $Z_1$ according to FIG. 1 should have the same impedance value as the balancing impedance $Z_2$ according to FIG. 2, seen from the two end points of the windings $I_1$ and $I_2$. This gives the following conditions:

$$\frac{\frac{1}{jwC_4}\left(R + \frac{1}{jwC_3}\right)}{R + \frac{1}{jwC_3} + \frac{1}{jwC_4}} = \frac{1}{jwC_5} + \frac{1}{\frac{1}{R_1} + \frac{1}{R_y} + jwC}$$

This equation is satisfied when:

$$\frac{1}{R_x} = \frac{1}{R}\left(1 + \frac{C_4}{C_3}\right)^2 \quad \ldots (1),$$

where $\frac{1}{R_x} = \frac{1}{R_1} + \frac{1}{R_y}$ and and $R_y$ = the resistance of the connected resistors $R_2$, $R_3$ according to FIG. 2.

$$C_5 = C_3\left(1 + \frac{C_4}{C_3}\right) \quad (2)$$

$$C = C_4\left(1 + \frac{C_4}{C_3}\right) \quad (3)$$

The capacitance values $C_4$ represent the variable capacitors according to FIG. 1. These values should be simulated as close as possible by the capacitance C. According to (3) this capacitance is dependent on both the capacitances $C_3$ and $C_4$. Since $$\frac{1}{R_x} = \frac{1}{R_1} + \frac{1}{R_y}$$

it is obtained from (1) that $$\frac{1}{R_1} + \frac{1}{R_y} = \frac{1}{R}\left(1 + \frac{C_4}{C_3}\right)^2 =$$

$$\frac{1}{R} + \frac{1}{R}\left(\left(1 + \frac{C_4}{C_3}\right)^2 - 1\right),$$

which is fulfilled for $R_1 = R$ and $$\frac{1}{R_y} = \frac{1}{R}\left(\left(1 + \frac{C_4}{C_3}\right)^2 - 1\right) \approx \frac{2}{R} \cdot \frac{C_4}{C_3} \quad \ldots (4)$$

when $\frac{C_4}{C_3} \ll 1$.

If thus the resistor $R_1$ in FIG. 2 were to have the same value as the resistor R in FIG. 1, resistors $R_2$, $R_3$ having the resistance $R_y$ determined according to (4) would have to be connected in parallel with the resistor $R_1$. If, furthermore, the value of the capacitance C is changed by connecting the capacitors $C_6$ and $C_7$, resistors $R_2$ and $R_3$ respectively must at the same time be connected in parallel with the resistors $R_1$ according to (1) and (3). The equation (2) indicates how much the capacitance $C_5$ of the constant capacitor differs from the original value $C_3$ according to FIG. 1. The following table can be set up for certain values of the capacitances $C_5$ and C and the resistor values of the resistor $R_1$ based on values of the capacitances $C_3$ and $C_4$, usually used (according to FIG. 1):

| $C_4$ | $C_5$ | C | $R_x/R$ | $R_y/R$ |
| --- | --- | --- | --- | --- |
| 0.002 | 2.162 | 0.0020 | 0.998 | 540 |
| 0.004 | 2.164 | 0.0040 | 0.996 | 270 |
| 0.008 | 2.168 | 0.0080 | 0.993 | 135 |
| 0.016 | 2.176 | 0.0161 | 0.985 | 67.3 |
| 0.032 | 2.192 | 0.0325 | 0.971 | 33.5 |
| 0.064 | 2.224 | 0.0659 | 0.943 | 16.6 |
| 0.126 | 2.286 | 0.133 | 0.893 | 8.33 |

The values of the capacitance $C_5$ according to the table are obtained according to the equation (2) with $C_3 = 2.16$ μF. Choosing a value $C_5 = 2.20$ μF of the capacitor $C_5$ in FIG. 2 a sufficiently good approximation of the constant capacitance is obtained and the series connection of the capacitor $C_2$ according to FIG. 2 gives a value $\approx 0.75$ μF. $R_x$ in the table above represents the resistance of the parallel connection of the resistor $R_1$ and the resistor or resistors $R_2$, $R_3$ which are connected together with the associated capacitors $C_6$ and/or $C_7$. The capacitance values of the capacitors $C_6$–$C_{11}$ can be chosen from the so called E 12-series i.e., $C_{11} = 0.0022$, $C_{10} = 0.0039$, $C_9 = 0.0082$, $C_8 = 0.015$, $C_7 = 0.033$, $C_6 = 0.068$ μF, the sum of which will be 0.130 μF, which gives a good adaptation to desired values of C. A correct value of the resistor $R_1$ according to the equation (1) above is obtained by connection of the resistors $R_2$, $R_3$. Regarding the lower capacitances, the proportion $R_1/R_2$, $R_1/R_3$ is very small for which reason no resistors connected in parallel with the capacitors $C_8$–$C_{11}$ (=0.0002–0.004 μF) are necessary. $R_y$ in the table represents the resistance to be connected in parallel with the capacitors $C_6$, $C_7$, i e $R_2$ and $R_3$ respectively. The proportion $R_y/R$ thus indicates how much greater $R_y$ should be relative to R for the chosen capacitances $C_6$, $C_7$. With the aid of the table suitable resistance value of $R_2$, $R_3$ can be estimated.

By the proposed balancing impedance, a capacitor with low values has been replaced by two capacitors with higher capacitance value at the cost of a few number of resistors. Since resistors are cheaper than capacitors, a total saving of costs is obtained.

I claim:

1. A balance impedance in a transformer hybrid circuit, said circuit including a two-wire path including a capacitor and, connected to said capacitor, a two-wire line including a line capacitance and a terminating resistance, a first and a second four-wire path and a balancing path, a balancing impedance connected to said balancing path, said balancing impedance including a first capacitor (C5) whose capacitance corresponds to said two-wire line capacitance and to said capacitance in the two-wire path, a first resistor, said first capacitor being connected in series with said first resistor (R1) whose value corresponds to said terminating resistance, a plurality of branches each including a capacitor (C6, C7, . . . ) connected in parallel with said first resistor and switch means (k1, k2, . . . ) included in said branches for selectively connecting each of said branches to said first capacitor, at least one of said branches including further resistor (R2, R3) connected in parallel with the capacitor in said one branch for simulating the line capacitance.

2. A balancing impedance according to claim 1 wherein the capacitance values of the respective capacitors in the respective branches have gradually decreasing values.

3. A balancing impedance according to claim 1 wherein the capacitance values of the respective capacitors in the respective branches have gradually increasing values.

4. A balancing impedance according to claim 1 wherein the resistance of the resistors in the respective branches have gradually increasing values.

5. A balancing impedance according to claim 1 wherein the resistance of the resistors in the respective branches have gradually decreasing values.

6. A balancing impedance according to claim 1 wherein the proportion between the resistance values of the resistors ($R_2$, $R_3$) in two of said branches equal the inverted value of the proportion between the capacitance values of of respective capacitor ($C_6$, $C_7$) in the associated branches.

* * * * *